(12) United States Patent
Yoshida

(10) Patent No.: US 11,972,742 B2
(45) Date of Patent: Apr. 30, 2024

(54) DISPLAY APPARATUS, PHOTOELECTRIC CONVERSION APPARATUS, ELECTRONIC EQUIPMENT, AND WEARABLE DEVICE

(71) Applicant: CANON KABUSHIKI KAISHA, Tokyo (JP)

(72) Inventor: Takayuki Yoshida, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/815,746

(22) Filed: Jul. 28, 2022

(65) Prior Publication Data
US 2023/0032431 A1  Feb. 2, 2023

(30) Foreign Application Priority Data

Jul. 30, 2021  (JP) .................................. 2021-126043
May 16, 2022  (JP) .................................. 2022-080354

(51) Int. Cl.
*G06F 3/01* (2006.01)
*G09G 5/14* (2006.01)

(52) U.S. Cl.
CPC .............. *G09G 5/14* (2013.01); *G06F 3/013* (2013.01); *G09G 2340/0407* (2013.01); *G09G 2340/10* (2013.01); *G09G 2354/00* (2013.01)

(58) Field of Classification Search
CPC ............. G09G 5/14; G09G 2340/0407; G09G 2340/10; G09G 2354/00; G06F 3/013
See application file for complete search history.

(56) References Cited

U.S. PATENT DOCUMENTS

| 2017/0236466 A1* | 8/2017 | Spitzer | G09G 3/3266 345/560 |
| 2022/0179484 A1* | 6/2022 | Youn | G06F 3/013 |

FOREIGN PATENT DOCUMENTS

| JP | 2019507380 A | 3/2019 |
| WO | 2017142613 A1 | 8/2017 |

* cited by examiner

*Primary Examiner* — Robert J Michaud
(74) *Attorney, Agent, or Firm* — CANON U.S.A., INC. IP Division

(57) ABSTRACT

An apparatus comprising a display in which a plurality of pixels are arranged in an array, and a generator configured to, in a first frame, generate first data corresponding to a first region of the display to display a first image in the first region of the display and, in a second frame, generate second data corresponding to a second region of the display, which includes the first region and is larger than the first region, to display a second image in the second region of the display is provided. A region of the second region is defined as a third region, a resolution of the first image and a resolution of at least the third region in the second image are different from each other.

17 Claims, 13 Drawing Sheets

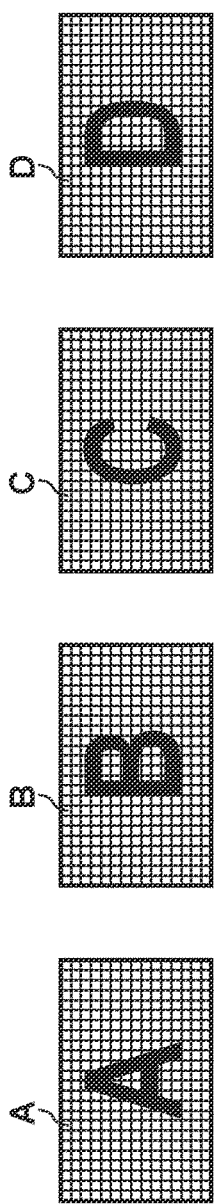
F I G. 8A
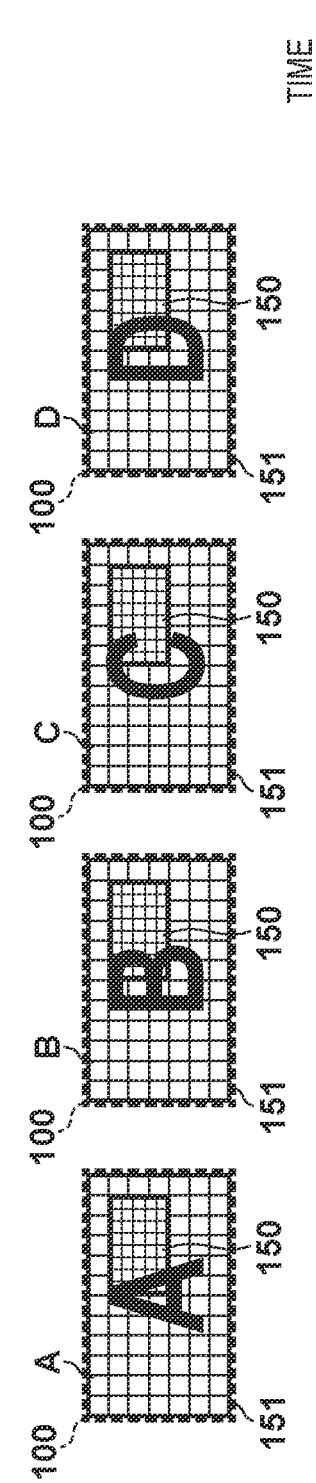
F I G. 8B
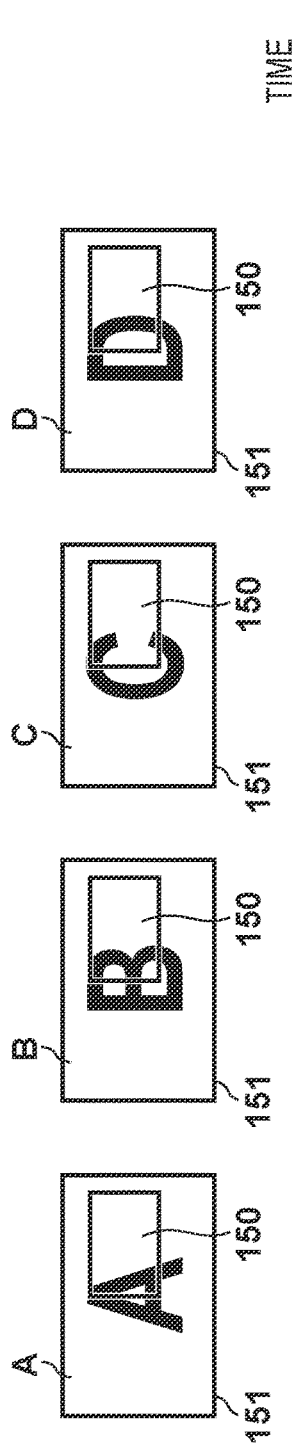
F I G. 8C

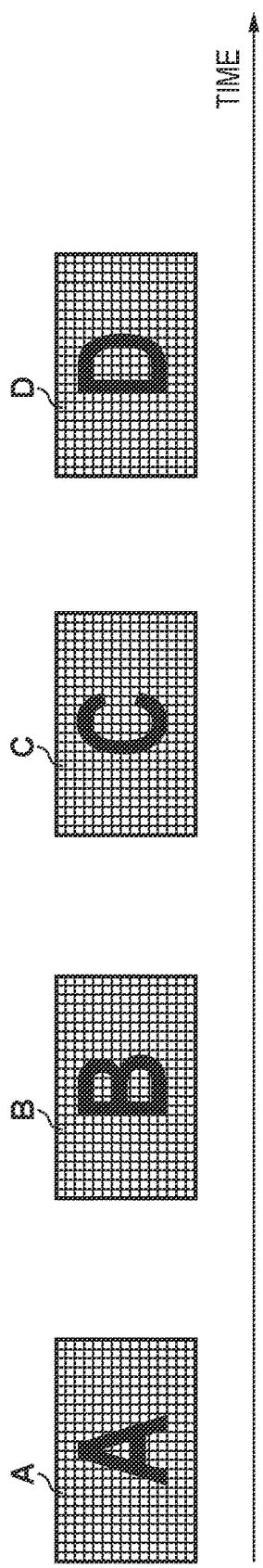
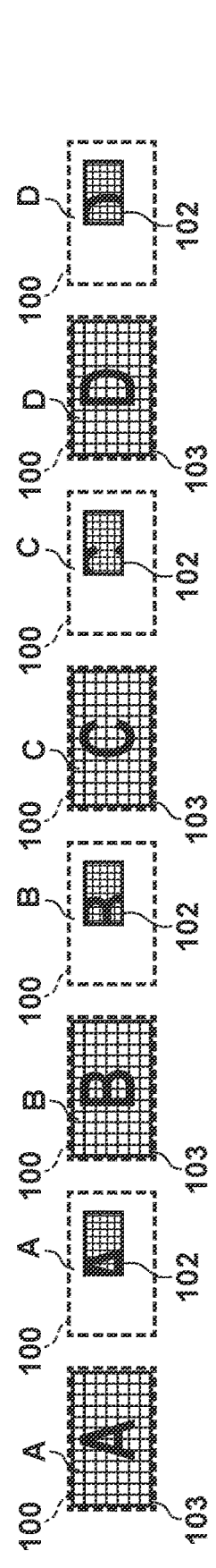
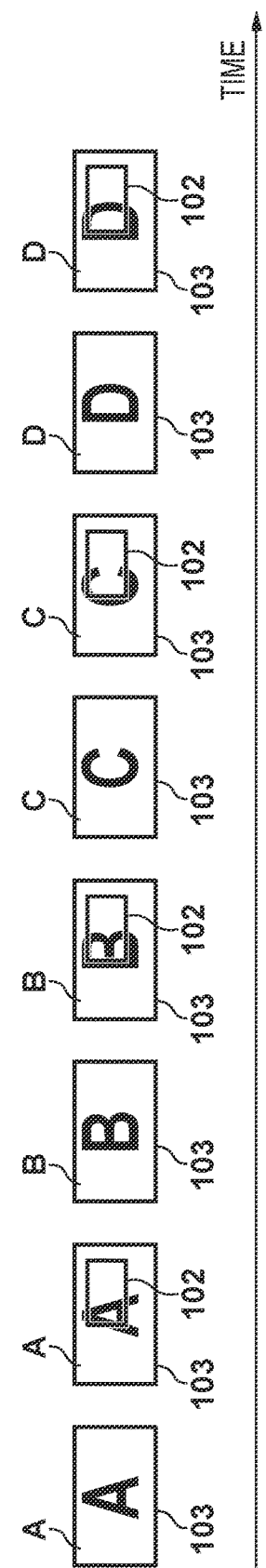

DISPLAY APPARATUS, PHOTOELECTRIC CONVERSION APPARATUS, ELECTRONIC EQUIPMENT, AND WEARABLE DEVICE

BACKGROUND

Technical Field

The aspect of the embodiments relates to a display apparatus, a photoelectric conversion apparatus, an electronic equipment, and a wearable device.

Description of the Related Art

In the human visual field, visual perception is clearest in the fovea, and the farther from the fovea, the less clear the visual perception. Therefore, a process called foveated rendering is performed in an Extended Reality (XR) display apparatus. The foveated rendering decreases an image processing load by drawing a peripheral region at a lower resolution than in the fovea region, which is in a gaze direction, of a display region. However, in recent XR displays, the number of pixels and the frame rate have been increased, so that there is demand for reduction of the bandwidth for transmitting display data to the display. Japanese Patent Laid-Open No. 2019-507380 describes that the low-resolution pixel data in the peripheral region is thinned out to compress the display data, thereby reducing the bandwidth for transmitting the display data to the display.

SUMMARY

According to an aspect of the embodiments, an apparatus comprising: a display in which a plurality of pixels are arranged in an array; and a generator configured to, in a first frame, generate first data corresponding to a first region of the display to display a first image in the first region of the display and, in a second frame, generate second data corresponding to a second region of the display, which includes the first region and is larger than the first region, to display a second image in the second region of the display, wherein a region of the second region is defined as a third region, a resolution of the first image and a resolution of at least the third region in the second image are different from each other, is provided.

Further features of the disclosure will become apparent from the following description of exemplary embodiments (with reference to the attached drawings).

BRIEF DESCRIPTION OF THE DRAWINGS

FIGS. 8A to 8C are views showing the concept of foveated rendering of a comparative example;

FIGS. 9A to 9C are views showing the concept of foveated rendering of the embodiment;

DESCRIPTION OF THE EMBODIMENTS

Figure 1:
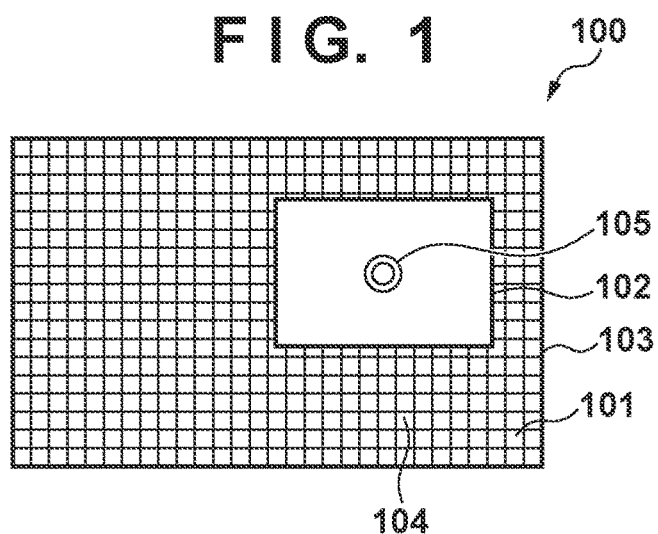
FIG. 1 is a view showing an arrangement example of regions in a display of a display apparatus of an embodiment.

Hereinafter, embodiments will be described in detail with reference to the attached drawings. Note, the following embodiments are not intended to limit the scope of the disclosure. Multiple features are described in the embodiments, but limitation is not made to a disclosure that requires all such features, and multiple such features may be combined as appropriate. Furthermore, in the attached drawings, the same reference numerals are given to the same or similar configurations, and redundant description thereof is omitted.

With reference to FIGS. 1 to 9C, a display apparatus according to an embodiment of the present disclosure will be described. The display apparatus of this embodiment is a display apparatus that can perform foveated rendering. That is, a display apparatus that can draw the peripheral region with a lower resolution than in the fovea region, which is in the gaze direction, of a display will be described. However, the disclosure is not limited to the foveated rendering, and the display apparatus of this embodiment is an apparatus that can display images having different resolutions by dividing a display which displays the images into two or more regions.

First, a foveated rendering process of a comparative example will be described. FIGS. 8A to 8C are views showing the concept of the foveated rendering of the comparative example. In the foveated rendering, the fovea region in the line-of-sight direction of a user is drawn with the resolution of a display 100 in which a plurality of pixels are arranged in an array. Meanwhile, a peripheral region in the periphery of the fovea region is drawn with a resolution lower than the resolution of the display 100 by, for example, causing multiple pixels to perform display corresponding to the same signal. In this case, in the foveated rendering of the comparative example, an image is generated by combining an image for the fovea region and an image for the peripheral region, the images having different resolutions, so as to match the resolution of the fovea region, that is, the resolution of the display 100, and the combined image is displayed for each display update timing of the display 100. FIG. 8A is a view showing display target images A, B, C, and D to be displayed temporally continuously on the display 100 of the display apparatus. For example, when the images are displayed on the display 100 of the display apparatus at 60 fps, the display target images A, B, C, and D are sequentially displayed on the display 100 every $1/60$ sec to update the image. Assume that the resolution of each of the display target images A, B, C, and D is equal to the resolution of the display 100. That is, the display target images A, B, C, and D are images before performing the foveated rendering process.

FIG. 8B is a view showing, for each of the display target images A, B, C, and D shown in FIG. 8A, a peripheral region 151 displayed with a resolution lower than the resolution of the display 100, and a fovea region 150 displayed with the resolution of the display 100. The fovea region 150 and the peripheral region 151 of the display 100 are updated at the same timing. That is, the display of the fovea region 150 and the display of the peripheral region 151 are switched at the same timing. Of the display data transferred from a data generation unit to a video display including the display 100 to display an image on the display 100, the display data for the peripheral region 151 displayed with a resolution lower than the resolution of the display 100 is compressed as described in Japanese Patent Laid-Open No. 2019-507380. Therefore, when displaying the image on the display 100, decoding processing of the display data is required. Further, the transferred display data includes the region having the resolution of the display 100 and the region having the resolution lower than the resolution of the display 100, so that there are rows having different data sizes in one display data. In addition, since the position of the fovea region 150 can change when the line of sight of the user changes or the like, the positions of the rows having different data sizes are not constant as well. Thus, a circuit which copes with there being rows having different data sizes in the display data for displaying one image and the positions of the rows having different data sizes changing for each display data is necessary. As a result, the circuit scale increases.

FIG. 8C is a view showing, with respect to time, images that the user can actually recognize visually when the display 100 is updated as shown in FIG. 8B. By the decoding circuit described above, the fovea region 150 is displayed with the resolution of the display 100. On the other hand, the peripheral region 151 is apparently displayed with the resolution lower than the resolution of the display 100 since multiple adjacent pixels display the same image (luminance).

Next, with reference to FIGS. 9A to 9C, the concept of the foveated rendering process of this embodiment will be described. Similar to FIG. 8A, FIG. 9A is a view showing the display target images A, B, C, and D to be displayed temporally continuously on the display 100 of the video display. FIG. 9B is a view showing, for each of the display target images A, B, C, and D shown in FIG. 9A, a region 103 displayed on the display 100 with a resolution lower than the resolution of the display 100, and a region 102 displayed with the resolution of the display 100. In the foveated rendering process of this embodiment shown in FIGS. 9A to 9C, two points described below are different from the comparative example shown in FIGS. 8A to 8C. The first point is that the region 103 does not correspond to the above-described peripheral region 151 but includes the region 102. The second point is that, at one update timing of the display 100, the image is updated in one of the region 102 and the region 103. In the region 103, the displayed image is updated with the resolution lower than the resolution of the display 100. FIG. 9C is a view showing, with respect to time, images that the user can actually recognize visually when the display 100 is updated as shown in FIG. 9B. In the comparative example, the image including the regions having different resolutions is always displayed. On the other hand, in this embodiment, there are a timing at which the image having the low resolution is displayed, and a timing at which the image (foveated rendering image) including regions having different resolutions are displayed as in the comparative example. In this manner, in this embodiment, a frame including the image having the lower resolution than the display 100 and a frame in which the foveated rendering image is displayed are repeated alternately or in a predetermined order.

Details of the region 102 and the region 103 in this embodiment will be described. The display 100 is divided into the region 102 in which a display image expected or estimated to be a target of gaze of the user is displayed, and the region 103 including the region 102. FIG. 1 shows the region 102 and the region 103 in the display 100. A plurality of pixels 101 are arranged in an array in the display 100. FIG. 1 shows an example in which the entire display 100 is the region 103, but a partial region of the display 100 may be set as the region 103. Even in this case, the region 102 is arranged in the region 103. Further, as shown in FIG. 1, a region of the region 103, which does not overlap the region 102, is referred to as a region 104. In the example shown in FIG. 1, the region 104 is arranged so as to surround the region 102, but the disclosure is not limited to this. For example, the right side of the region 102 and the right side of the region 103 may be the same pixel 101. That is, the pixel 101 set as the region 102 is also the pixel 101 set as the region 103.

The display 100 is formed as an array of the pixel 101, and each pixel 101 is a light emitting element. An exemplary pixel arrangement of the pixel 101 may include, for example, a light emitting diode (LED) or, for example, may include an organic light emitting diode (OLED). The position of the region 102 in the display 100 may be decided based on a line-of-sight position 105 of the user with respect to the display 100. For example, the position of the region 102 in the display 100 may be fixed at the center of the display 100.

The region 102 is a region in which a display image is displayed with the resolution of the display 100. The region 103 may be a region which includes the region 102 and is larger than the region 102 in the row direction and the column direction. In the region 103, the display image is displayed with the resolution lower than the resolution of the display 100 arranged in the video display. The resolution of the region 103 may be a fixed value, or may be decided by an arbitrary set value.

In one display update of the display 100, the display in one of the region 102 and the region 103 of the display 100 is updated. For example, in the first frame, image update is performed in the region 103. In the second frame, image update is performed in the region 102. By repeating these operations, the foveated rendering is implemented. Therefore, the display data required for one display update of the display 100 is one of the display data for the region 102, that is, the display data having the resolution (to be sometimes referred to as the high resolution hereinafter) of the display 100 in a limited region, and the display data for the region 103, that is, the display data having the resolution (to be sometimes referred to as the low resolution hereinafter) lower than the resolution of the display 100. The display data for the region 103 is transferred intact as the display data having the resolution lower than the resolution of the display 100 to the video display, and processing of assigning data for one pixel of the display data to multiple pixels 101 of the display 100 is performed on the video display side. For example, when the low-resolution display data is reduced to 50% in the vertical and lateral directions, one data may be assigned to four pixels 101 in two rows×two columns. With this, even for the display in the region 103, that is, the display of the low-resolution display data, the image data transmission band proportional to the resolution is used. Hence, for example, in a case in which the region 102 is a region in which the number of the pixels is ¼ of the total number of pixels in the display 100, and the region 103 is a region in which the number of pixels is equal to the total number of pixels in the display 100 and the resolution is ¼ of the resolution of the display 100, the bandwidth for transmitting the display data becomes ¼ as compared to a case of displaying the image on the entire display 100. Further, in this case, the size of the display data for the region 102 becomes equal to the size of the display data for the region 103. Thus, even when the display data for each of the regions 102 and 103 is transferred from the data generator to the video display, the vertical and horizontal sizes of the image corresponding to the display data are unified.

The arrangement of a display apparatus DS for implementing the foveated rendering process described above is shown in FIG. 2. FIGS. 3 and 4 illustrate processing steps of the foveated rendering process of the display apparatus DS. After describing respective components shown in FIG. 2, the basic procedure of this embodiment will be described using the processing steps illustrated in FIGS. 3 and 4.

As has been described above, the display apparatus DS includes a video display 200 including the display 100 in which the plurality of pixels 101 are arranged in an array. The display apparatus DS also includes a data generator 201 that generates display data (to be sometimes referred to as high-resolution display data hereinafter) corresponding to the region 102 of the display 100 and display data (to be sometimes referred to as low-resolution display data hereinafter) corresponding to the region 103 of the display 100, which includes the region 102 and is larger than the region 102, and transfers the display data to the display 100. Further, the display apparatus DS may include a line-of-sight detector 202 that detects the line-of-sight position of the user with respect to the display 100.

The line-of-sight detector 202 may include an arbitrary one of various gaze tracking systems well known in this field of art, which are utilized to track the gaze of a user with respect to the corresponding display 100, that is, the region of the display 100 which the user is gazing at. The line-of-sight detector 202 generates and transmits line-of-sight information to the data generator 201. The data generator 201 generates a display data signal 220 to be displayed on the display 100, a region flag signal 210, and a fovea control signal 219 for controlling a fovea control circuit 211, and outputs them to the video display 200. The display data signal 220 is digital data (tone value) corresponding to the light emission luminance of the pixel 101. The region flag signal 210 is a 1-bit flag signal indicating whether the display data signal 220 to be transferred next is data for the region 102 or data for the region 103. The fovea control signal 219 is a signal representing position information in the line-of-sight direction, which is address information indicating the given pixel 101 corresponding to the line-of-sight position of the user among the pixels 101 arranged in the display 100.

The video display 200 includes the fovea control circuit 211, a column control circuit 212, a low-resolution region buffer 213, a column memory 214, a row control circuit 215, row selection circuits 216, and the display 100. The fovea control circuit 211 generates and outputs the position information of the region 102 based on the fovea control signal 219 received from the data generator 201 and the size information of the region 102 set in advance. Here, the size information of the region 102 indicates the size corresponding to the number of pixels in the vertical and lateral directions of the pixel array formed by the pixels 101 arranged in the display 100. The position information of the region 102 is the information indicating the start position of the region 102 calculated from the size information of the region 102 and the position information in the line-of-sight direction included in the fovea control signal 219.

The column control circuit 212 receives the region flag signal 210 from the data generator 201, and performs control operations of two patterns in accordance with the region flag signal 210. The low-resolution region buffer 213 is controlled by the column control circuit, and stores and loads the display data. The column memory 214 is controlled by the column control circuit 212, receives the display data for one column from the column control circuit 212 or the low-resolution region buffer 213, and transfers it to the display 100. When low-resolution display data is input, the row control circuit 215 selects multiple row selection circuits 216 in accordance with the resolution. When high-resolution display data is input, the row control circuit 215 selects the row selection circuits 216 based on the position information given by the fovea control circuit 211. The row selection circuit 216 is controlled by a signal given by the row control circuit 215, and selects the row of the pixels 101 of the display 100 for display update.

Next, the basic procedure of this embodiment will be described using the processing steps illustrated in FIGS. 3 and 4. The processing steps illustrated in FIG. 3 are processing steps in the data generator 201, and the processing steps illustrated in FIG. 4 are processing steps in the video display 200.

Step S301 is processing of generating the region flag signal 210. The region flag signal 210 includes a first region flag indicating the display data for the region 102, and a second region flag indicating the display data for the region 103. Generation of the region flag signals 210 is performed for each frame, and the first region flag or the second region flag is generated alternately or in a predetermined order.

Step S302 is processing of determining whether the region flag signal 210 generated in step S301 is the first region flag or the second region flag. If the region flag signal 210 is the second region flag in step S302, processing steps from S303 to S305 are performed. If the region flag signal 210 is the first region flag in step S302, processing steps S306 and S307 are performed.

If the region flag signal 210 is the second region flag in step S302, the processing step transitions to step S303. Step S303 is processing of generating the fovea control signal 219 from the line-of-sight information received from the line-of-sight detector 202 and holding it. When the fovea control signal 219 is generated, the processing step transitions to step S304. Step S304 is processing of transferring the region flag signal 210 to the video display 200. When the region flag signal 210 is transferred to the video display 200, the processing step transitions to step S305. Step S305 is processing of generating low-resolution display data which is obtained by, for example, compressing the image in the vertical and lateral directions such that the number of pixels thereof becomes ¼ of the number of pixels in the display 100. That is, step S305 is a step in which the data generator 201 generates the display data corresponding to the region 103 of the display 100, which includes the region 102 and is larger than the region 102.

If the region flag signal 210 is the first region flag in step S302, the processing step transitions to step S306. Step S306 is processing of transferring the region flag signal 210 and the fovea control signal 219 to the video display 200. When the region flag signal 210 and the fovea control signal 219 are transferred to the video display 200, the processing step transitions to step S307. In step S307, high-resolution display data is generated, which is obtained by, for example, clipping the image such that the number of pixels thereof becomes ¼ of the number of pixels in the display 100 based on the fovea control signal 219 generated in step S303. That is, step S307 is a step in which the data generator 201 generates the display data corresponding to the region 102 of the display 100.

When the low-resolution display data (step S305) or the high-resolution display data (step S307) is generated, the processing step transitions to step S308. Step S308 is processing of transferring the display data generated in step S305 or step S307 to the video display 200, for example, on a row basis. The above is the description of the processing steps of the data generator 201.

Next, processing steps of the video display 200 will be descried with reference to FIG. 4. Each of steps S320, S321, and S327 is processing in the column control circuit 212. Step S320 is processing of determining whether the region flag signal 210 transferred from the data generator 201 is the first region flag or the second region flag. If the region flag signal 210 is the second region flag in step S320, the processing step transitions to step S321. If the region flag signal 210 is the first region flag in step S320, the processing step transitions to step S327. Each of steps S321 and S327 is processing of waiting for the display data input from the data generator 201.

If transfer of the display data is started in step S321, the processing step transitions to step S322. Each of processing steps S322, S323, and S324 is processing in the column control circuit 212 and the low-resolution region buffer 213. In step S322, it is determined whether the transferred row data included in the display data transferred from the data generator 201 is the data for the row including the region 102. If the display data transferred from the data generator 201 is the data for the row including the region 102 in step S322, the processing step transitions to step S323. In step S323, the data used to display the region 104, which will be short when performing display processing of the region 102, is stored in the low-resolution region buffer 213. When the data used to display the region 104 is stored in the low-resolution region buffer 213, the processing step transitions to step S324.

If it is determined in step S322 that the display data transferred from the data generator 201 is the data for the row not including the region 102, the processing step transitions to step S324. At this time, the display data for the corresponding row may be stored in the low-resolution region buffer 213.

Step S324 is processing of duplicating the data for one pixel 101 such that the low-resolution display data having the resolution lower than the resolution of the display 100 matches the resolution of the display 100, and transferring the data to the column memory 214. Next, step S325 is processing in the column memory 214, the row control circuit 215, and the row selection circuit 216. In processing step S325, the row control circuit 215 selects one or more row selection circuits 216 in accordance with the resolution of the low-resolution display data, and the display of the pixel 101 is updated with the value of the column memory 214. Then, in step S326, it is determined whether the processing has reached the final row of the region 103. The processing steps S322 to S326 are repeated until the processing reaches the final row.

Next, if the region flag signal 210 is the first region flag in step S320 and transfer of the display data is started in step S327, the processing step transitions to step S328. Each of processing steps S328 and S329 is processing in the column control circuit 212 and the low-resolution region buffer 213. Step S328 is processing of loading the display data for the region 104 stored in the low-resolution region buffer 213 in step S323 to the column control circuit 212. Next, step S329 is processing of transferring the high-resolution display data transferred from the data generator 201 and the display data for the region 104 loaded in step S328 to the column memory 214. At this time, from the data loaded in step S328, the low-resolution display data is duplicated so as to match the resolution of the display 100 as in step S324, and transferred to the column memory 214. Step S330 is processing in the column memory 214, the row control circuit 215, and the row selection circuit 216. Step S330 is processing of selecting one row selection circuit 216 in accordance with the current row, and updating the display of the pixel 101 with the value of the column memory 214. Then, in step S331, it is determined whether the processing has reached the final row of the region 103. The processing steps S328 to S331 are repeated until the processing reaches the final row. Even in the row not including the region 102, the display can be updated using the display data for the region 104 stored in the low-resolution region buffer 213.

In this embodiment, in the first frame, the data generator 201 generates the high-resolution display data corresponding to the region 102 of the display 100 to display an image (to be sometimes referred to as a high-resolution image hereinafter) in the region 102 of the display 100. In the second frame, the data generator 201 generates the low-resolution display data corresponding to the region 103 of the display 100, which includes the region 102 and is larger than the region 102, to display an image (to be sometimes referred to as a low-resolution image hereinafter) in the region 103 of the display 100. For example, the display apparatus DS repeats the first frame (to be sometimes referred to the high-resolution frame hereinafter) and the second frame (to be sometimes referred to as the low-resolution frame hereinafter) in a predetermined order (for example, alternately). With this, in the display 100, the high-resolution image and the low-resolution image, whose areas and resolutions are different from each other, are repeatedly displayed in the predetermined order (for example, alternately).

As has been described above, the display apparatus DS further includes the low-resolution region buffer 213 that holds the low-resolution display data in the video display 200. In the high-resolution frame for displaying the high-resolution image, the display 100 may display, in the region 104, an image corresponding to the low-resolution image using the low-resolution display data received in the frame for displaying the low-resolution image, which precedes the frame for displaying the high-resolution image. That is, as in the foveated rendering process of the comparative example, an image having different resolutions in different regions may be displayed in the high-resolution frame. Therefore, when displaying an image, the display apparatus DS may start the operation from the low-resolution frame. In other words, when displaying an image, the data generator 201 may first generate low-resolution display data corresponding to the region 103 of the display 100 to display a low-resolution image in the region 103 of the display 100, and then generate high-resolution display data corresponding to the region 102 of the display 100 to display it on the display 100.

In this embodiment, the case has been described in which the region 102 has the area corresponding to ¼ of the total number of pixels in the display 100 and the resolution 1/1 of the resolution of the display 100, and the region 103 has the area corresponding to the 1/1 of the total number of pixels in the display 100 and the resolution 1/4 of the resolution of the display 100. In this manner, the ratio of the resolution of the low-resolution image to the resolution of the high-resolution image may be equal to the ratio of the number of the pixels 101 in the region 102 to the number of pixels in the region 103 with respect to the number of the pixels 101 in the display 100. Thus, the size of the display data for the region 102 and that for the region 103 become equal to each other. Hence, when the display data is transferred from the data generator 201 to the video display 200, the transmission bandwidth for the high-resolution display data becomes equal to the transmission bandwidth for the low-resolution display data. Accordingly, unlike the case in which the length of display data changes for each row, the circuit scale in the video display 200 can be suppressed. However, the disclosure is not limited to this, and an appropriate combination of the area and resolution of the region 102 and those of the region 103 may be used.

According to this embodiment described above, the circuit scale in the video display 200 and the data generator 201 can be suppressed as compared to the arrangement for display in the comparative example. In addition, it is possible to provide the display apparatus DS that can perform the foveated rendering while suppressing the transmission bandwidth for the display data between the data generator 201 and the video display 200.

In this embodiment, as shown in FIGS. 9A and 9B, the data generator 201 generates, from one image data (for example, the display target image A), the high-resolution display data and the low-resolution display data used in continuous frames including the frame for displaying a high-resolution image and the frame for displaying a low-resolution image. However, the disclosure is not limited to this. The data generator 201 may generate, from image data different from each other, the high-resolution display data and the low-resolution display data used in the continuous frames including the frame for displaying the high-resolution image and the frame for displaying the low-resolution image. Although the amount of the required image data increases, the image quality of the displayed image can be improved by smoother moving image display or the like.

In this embodiment, the example has been described in which the foveated rendering process for displaying a high-resolution image in the region 102 is performed in the display apparatus DS. However, the disclosure is not limited to this. A low-resolution image may be displayed in the region 102 included in the region 103. For example, there can be a case in which an image capturing condition such as the shutter speed is displayed in a partial region of a finder of a camera or the like. In this case, a high-resolution image may be displayed in the region 103 of the display 100, and a low-resolution image may be displayed in the region 102 included in the region 103. At this time, the data generator 201 may generate, from image data different from each other, high-resolution display data and low-resolution display data used in continuous frames including the frame for displaying the high-resolution image and the frame for displaying the low-resolution image. That is, the high-resolution display data may be landscape display data, and the low-resolution display data may be image capturing condition display data. Since the length of the display data does not change for each row in one display data, the circuit scale in the video display 200 can be suppressed. Further, by reducing the data amount in the low-resolution display data, the transmission bandwidth for the display data between the data generator 201 and the video display 200 can be suppressed.

Figure 5:
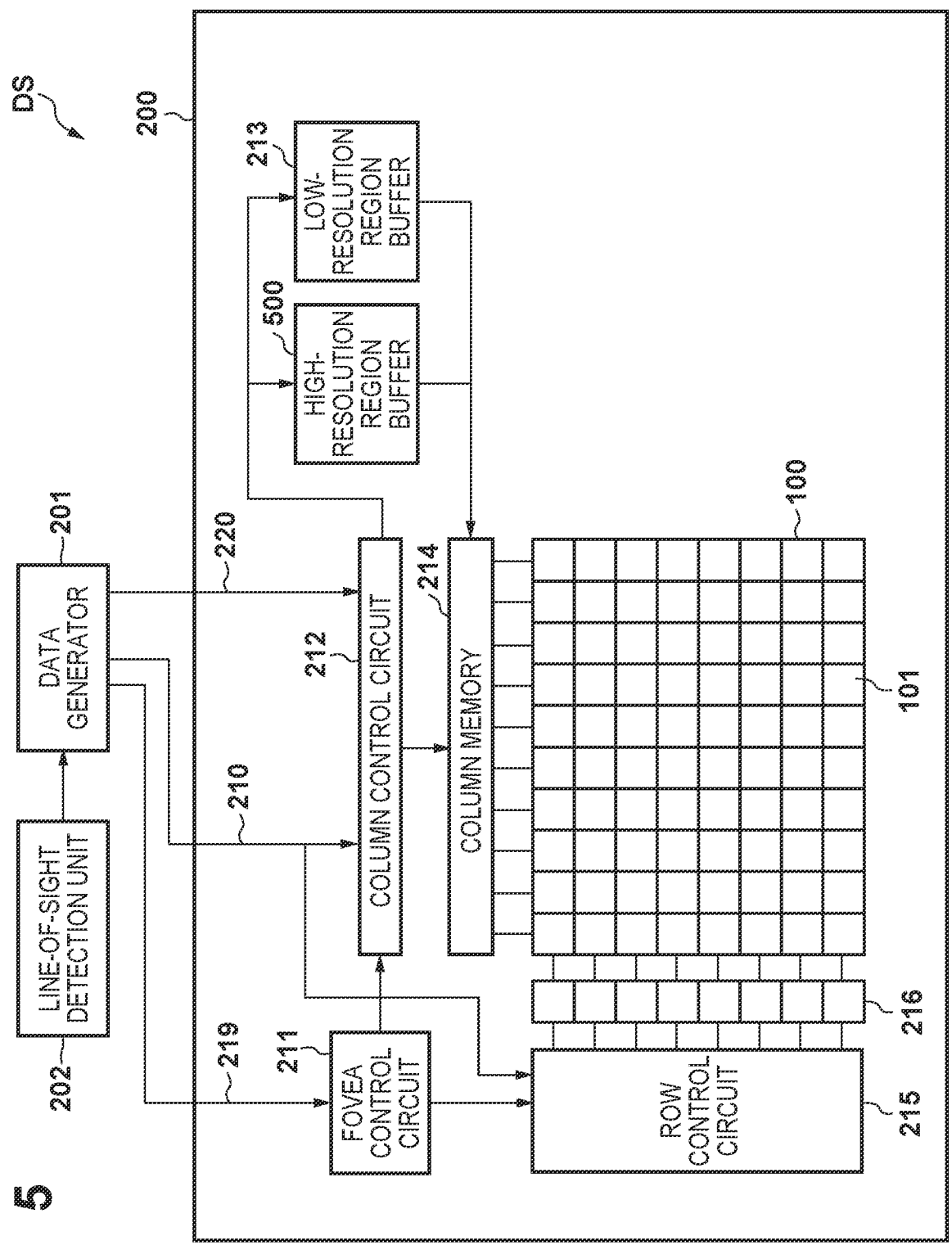
FIG. 5 is a block diagram showing another arrangement example of the display apparatus of the embodiment.

Next, with reference to FIGS. 5 and 6, a modification of the display apparatus DS described above will be described. FIG. 5 is a block diagram showing another arrangement of the display apparatus DS. A high-resolution region buffer 500 is added to the video display 200 as compared to the arrangement shown in FIG. 3. Since the rest of the arrangement may be the same as that of the display apparatus DS shown in FIG. 3, the operation difference caused by adding the high-resolution region buffer 500 will be described.

The high-resolution region buffer 500 is a data buffer that is controlled by the column control circuit 212, and stores and loads high-resolution display data. The low-resolution region buffer 213 stores the low-resolution display data for the pixel located in the row included in the region 102 but in the column included in the region 103. The stored display data is loaded and used when updating the display in the region 102 using the high-resolution display data. Further, the low-resolution region buffer 213 stores the low-resolution display data for the region 104. The stored low-resolution display data is loaded and used when updating the display in the region 102 using the high-resolution display data. On the other hand, the high-resolution region buffer 500 stores the high-resolution display data for the region 102. The stored high-resolution display data is loaded and used when updating the region 103 using the low-resolution display data. With this, even when updating the display in the region 103 using the low-resolution display data, the display within the region 102 can be updated with the resolution of the display 100.

Figure 6:
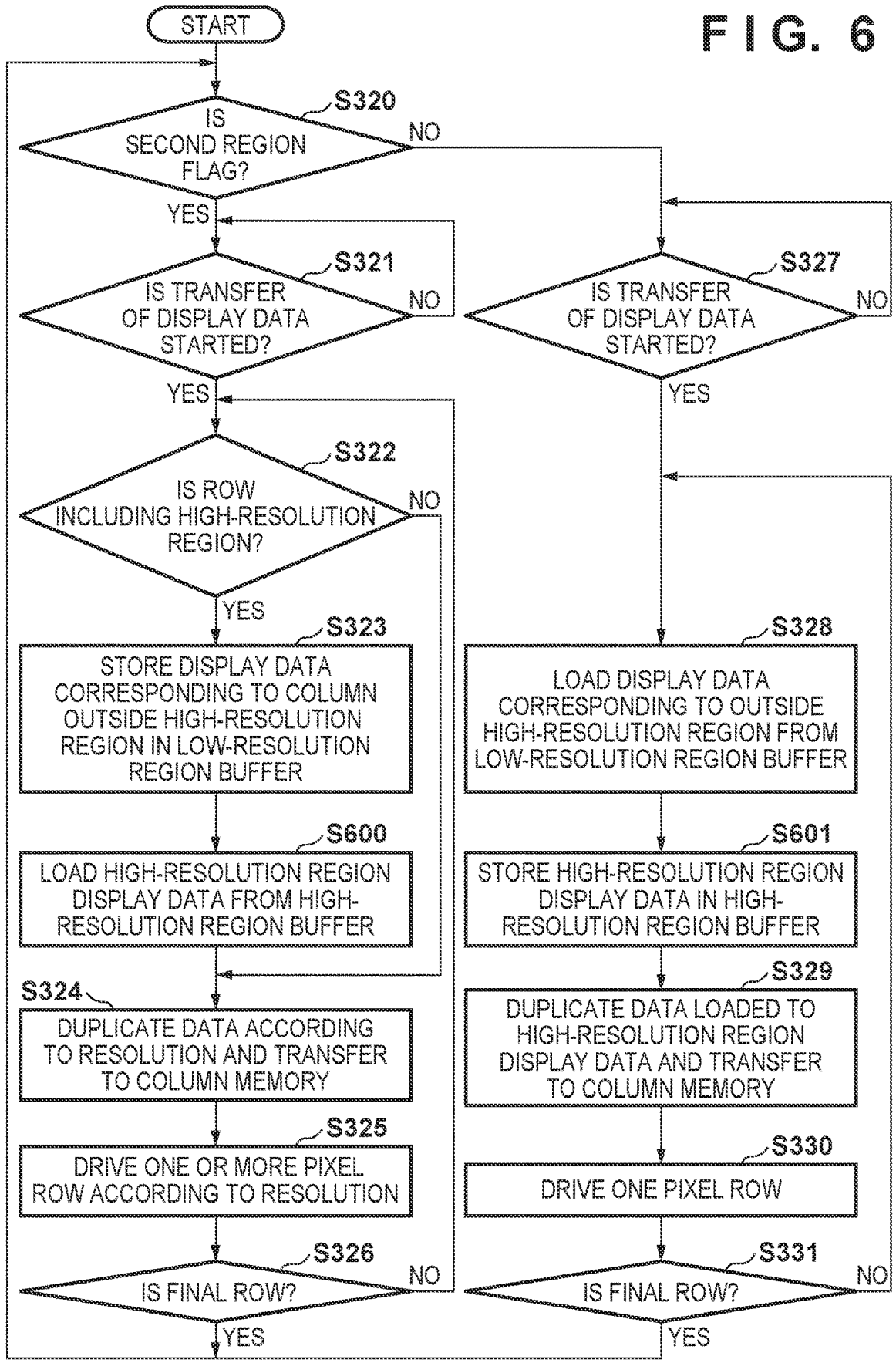
FIG. 6 is a flowchart illustrating display processing steps in the display apparatus of the embodiment.

FIG. 6 illustrates processing steps of the video display 200 having the arrangement shown in FIG. 5. Steps S600 and S601 are added as processing steps to the processing steps illustrated in FIG. 4. The other processing steps may be similar to those described above, so that steps S600 and S601 will be described.

Step S601 is processing in the column control circuit 212 and the high-resolution region buffer 500. If the region flag signal 210 is not the second region flag, that is, it is the first region flag in processing step S320, the high-resolution display data transferred from the data generator 201 is stored in the high-resolution region buffer 500 in step S601. Step S600 is processing in the column control circuit 212 and the high-resolution region buffer 500. If the transferred row data included in the low-resolution display data transferred from the data generator 201 is determined to be the data for the row including the region 102, the high-resolution display data stored in the high-resolution region buffer 500 in step S601 is loaded as the display data for the region 102 in step S600.

Figure 2:
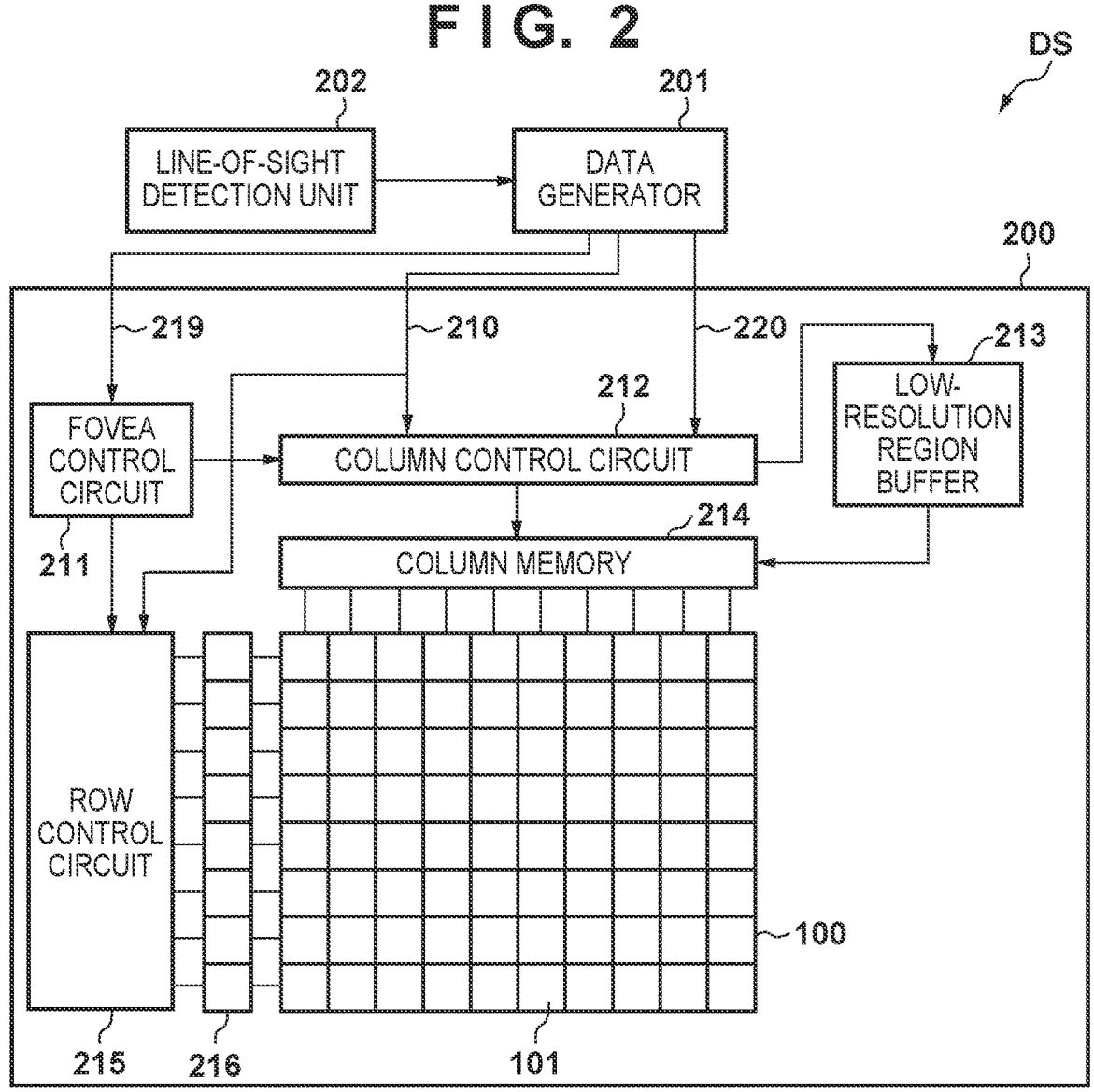
FIG. 2 is a block diagram showing an arrangement example of the display apparatus of the embodiment.
Figure 3:
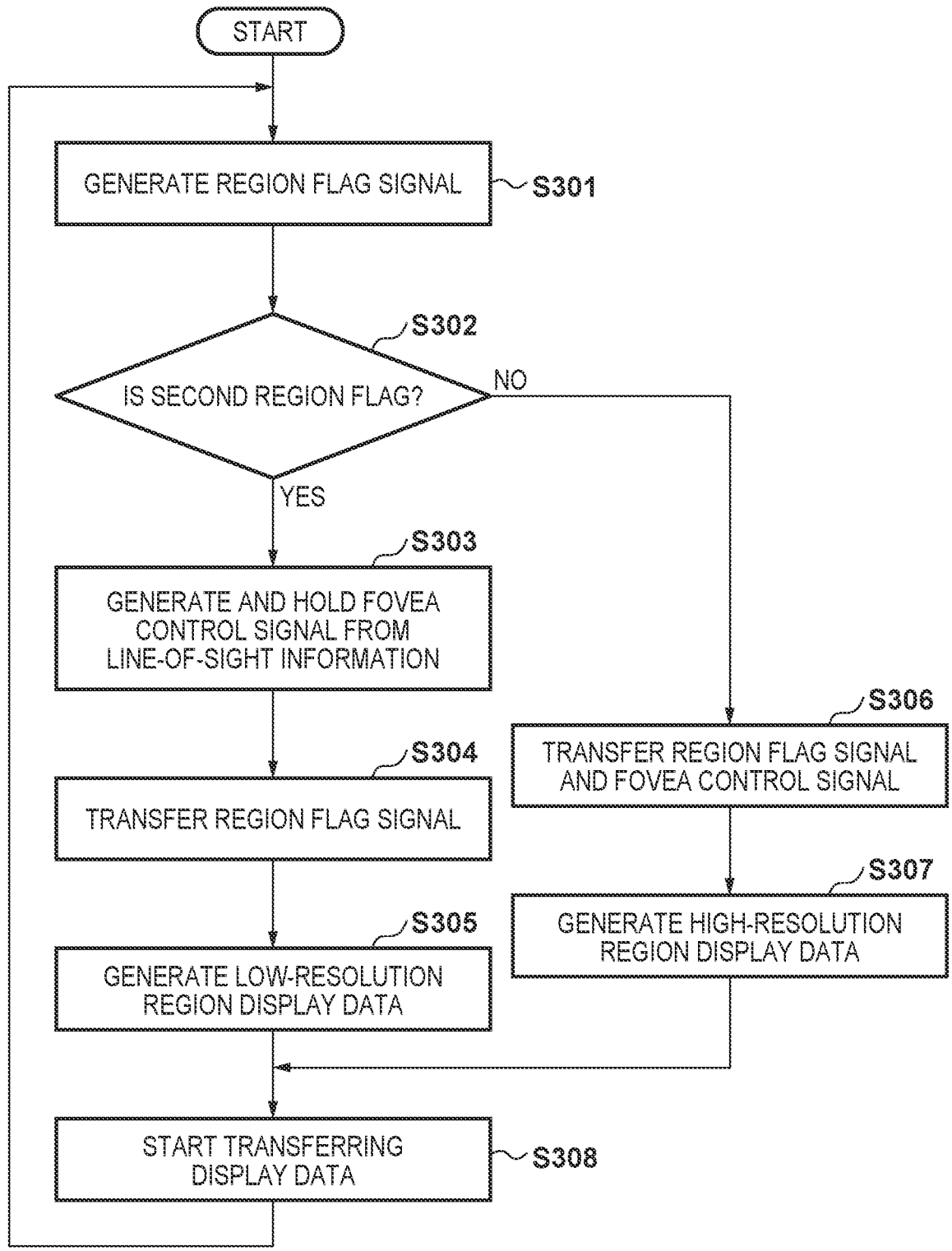
FIG. 3 is a flowchart illustrating data generation processing steps in the display apparatus of the embodiment.
Figure 4:
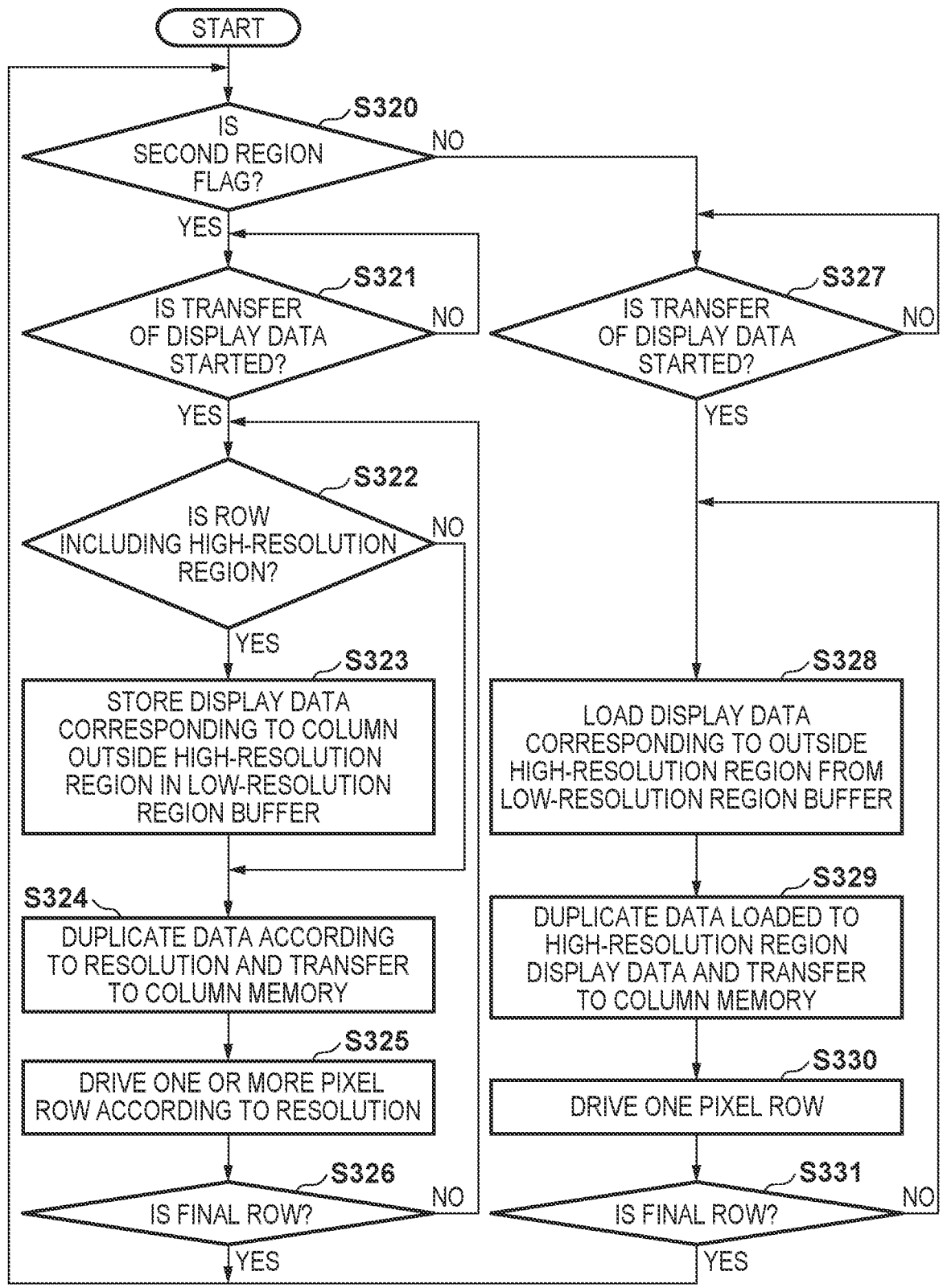
FIG. 4 is a flowchart illustrating display processing steps in the display apparatus of the embodiment.

In the configuration illustrated in FIGS. 2 to 4, the resolution of the image displayed in the region 102 by receiving the high-resolution display data is different from the resolution of the image displayed in the region 103 by receiving the low-resolution display data. More specifically, the resolution of the image displayed in the region 102 by receiving the high-resolution display data is higher than the resolution of the image displayed in the region 103 by receiving the low-resolution display data. On the other hand, in the configuration illustrated in FIGS. 5 and 6, the high-resolution region buffer 500 for holding the high-resolution display data in the video display 200 is further included. In a frame for displaying a low-resolution image, the display 100 uses the high-resolution display data received in the frame for frame displaying the high-resolution image, which precedes the frame for displaying the low-resolution image, to display, in the region 102, an image corresponding to the high-resolution image. As a result, the resolution of the image in the region 102 in the frame for displaying the image by receiving the high-resolution display data and the resolution of the region 104 of the image in the frame for displaying the image by receiving the low-resolution display data are different from each other. That is, it can be said that, in each embodiment described above, the resolution of the image in the region 102 in the frame for displaying the image by receiving the high-resolution display data and the resolution of at least the region 104 of the image in the frame for displaying the image by receiving the low-resolution display data are different from each other.

As has been described above, also in this embodiment described above, the circuit scale in the video display 200 and the data generator 201 can be suppressed as compared to the arrangement for display in the comparative example. In addition, it is possible to provide the display apparatus DS that can perform the foveated rendering while suppressing the transmission bandwidth for the display data between the data generator 201 and the video display 200. Further, by arranging the high-resolution region buffer 500, it becomes possible to always display a high-resolution image in the region 102. Thus, the image quality of the image displayed on the display 100 of the display apparatus DS can be improved.

Consider a case in which the column control circuit 212 performs the processing of duplicating data from the data stored in the low-resolution region buffer 213 and transferring it to the column memory 214 and the row control circuit 215 performs the processing of selecting one or more row selection circuits 216 to update the display of the pixel 101 with the value of the column memory 214 while suppressing the circuit scale. For example, the resolution of the image displayed in the region 102 using the high-resolution display data may be $2^n$ times the resolution in at least the region 104 of the image displayed using the low-resolution display data. Here, n is a positive integer. By setting the displayable resolution in advance upon displaying the image corresponding to the low-resolution display data, it is possible to suppress the circuit scale in the video display 200.

For example, the column control circuit 212 duplicates the data and transfers it to the column memory 214 so as to correspond to two columns, four columns, or the like. At this time, the row control circuit 215 may select the row selection circuits 216 corresponding to one row, two rows, four rows, or the like, and update the display of the pixel 101 with the value of the column memory 214. If the column control circuit 212 does not duplicate the data for the column memory 214, the row control circuit 215 may select the row selection circuits 216 corresponding to two rows, four rows, or the like, and update the display of the pixel 101 with the value of the column memory 214. The number of the pixels 101 in the region 102 may be $\frac{1}{2^n}$ of the number of the pixels 101 in the region 103.

Figure 7:
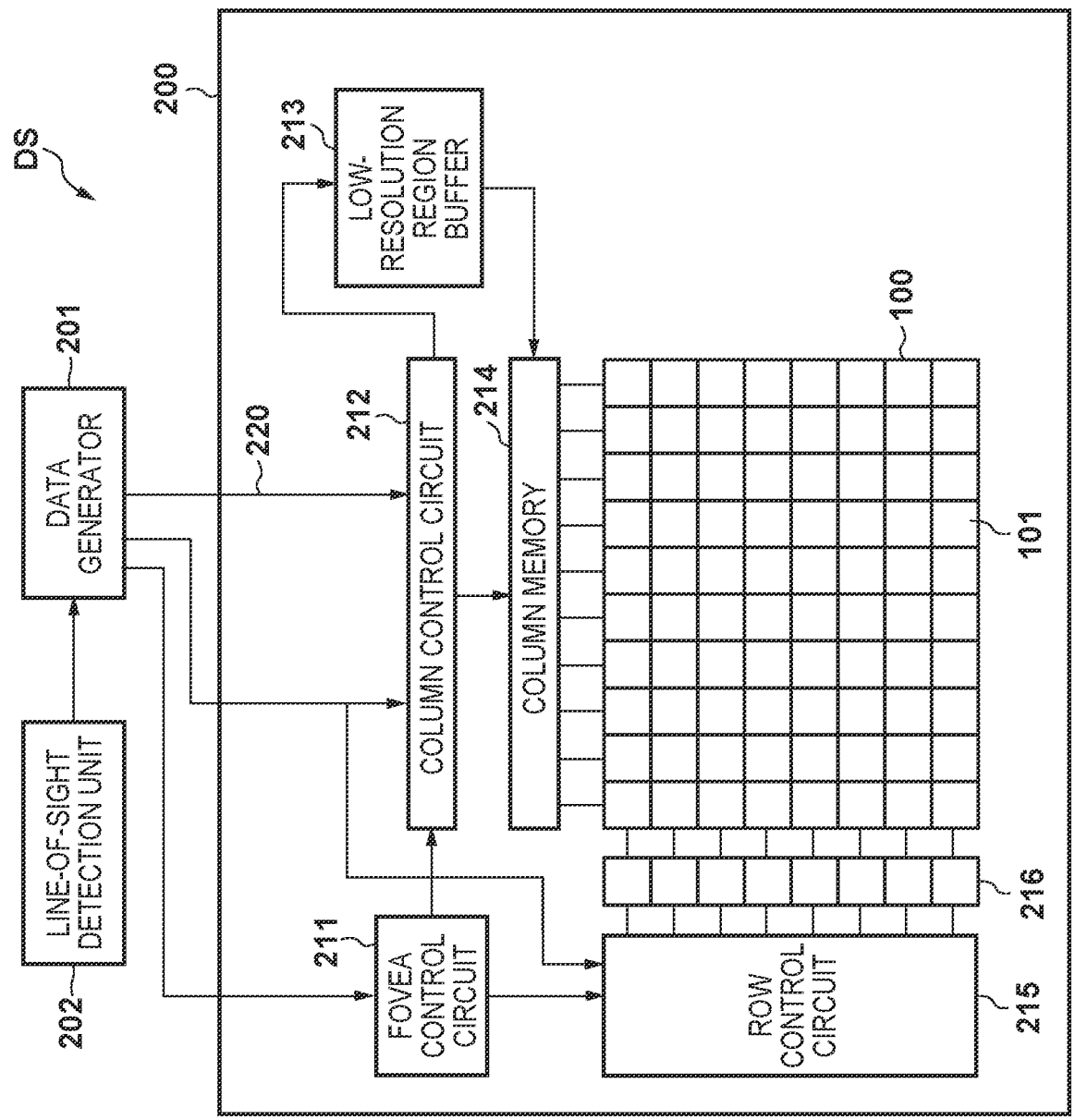
FIG. 7 is a block diagram showing still another arrangement example of the display apparatus of the embodiment.

FIG. 7 is a block diagram showing another modification of the display apparatus DS shown in FIG. 2. In the arrangement shown in FIG. 7, the fovea control signal 219 and the region flag signal 210 transferred from the data generator 201 to the video display 200 are integrated into the display data signal 220. The display data signal 220 is not constantly transferred from the data generator 201 to the video display 200, but there is a period in which no display data is transferred between the display data corresponding to one image and the display data corresponding to next one image. Therefore, it is possible to transfer the fovea control signal 219 and the region flag signal 210 via a signal line common to the display data signal 220. The respective signals can be distinguished as the fovea control signal 219, the region flag signal 210, and the display data signal 220 based on the transfer timing or a specific flag value. The processing steps may be similar to those illustrated in FIGS. 3 and 4 described above. Also in the arrangement shown in FIG. 5, it is possible to transfer the fovea control signal 219 and the region flag signal 210 via the signal line common to the display data signal 220. In this case, the processing steps may be similar to those illustrated in FIG. 6 described above.

As in each embodiment described above, also in the display apparatus DS having the arrangement shown in FIG. 7, the circuit scale in the video display 200 and the data generator 201 can be suppressed as compared to the arrangement for display in the comparative example. It is also possible to provide the display apparatus DS that can perform the foveated rendering while suppressing the transmission bandwidth for the display data between the data generator 201 and the video display 200.

Here, with reference to FIGS. 10 to 14, actual application examples of the display apparatus DS of this embodiment, and examples of application of the display apparatus DS to a photoelectric conversion apparatus, an electronic equipment, and a wearable device will be described. The display apparatus DS may be an image information processing apparatus that includes an image input unit for inputting image information from an area CCD, a linear CCD, a memory card, or the like, and an information processing unit for processing the input information, and displays the input image on the display unit 100. The display 100 included in a camera or an inkjet printer may have a touch panel function. The driving type of the touch panel function may be an infrared type, a capacitance type, a resistive film type, or an electromagnetic induction type, and is not particularly limited. The display apparatus may be used for the image display of a multifunction printer.

Figure 10:
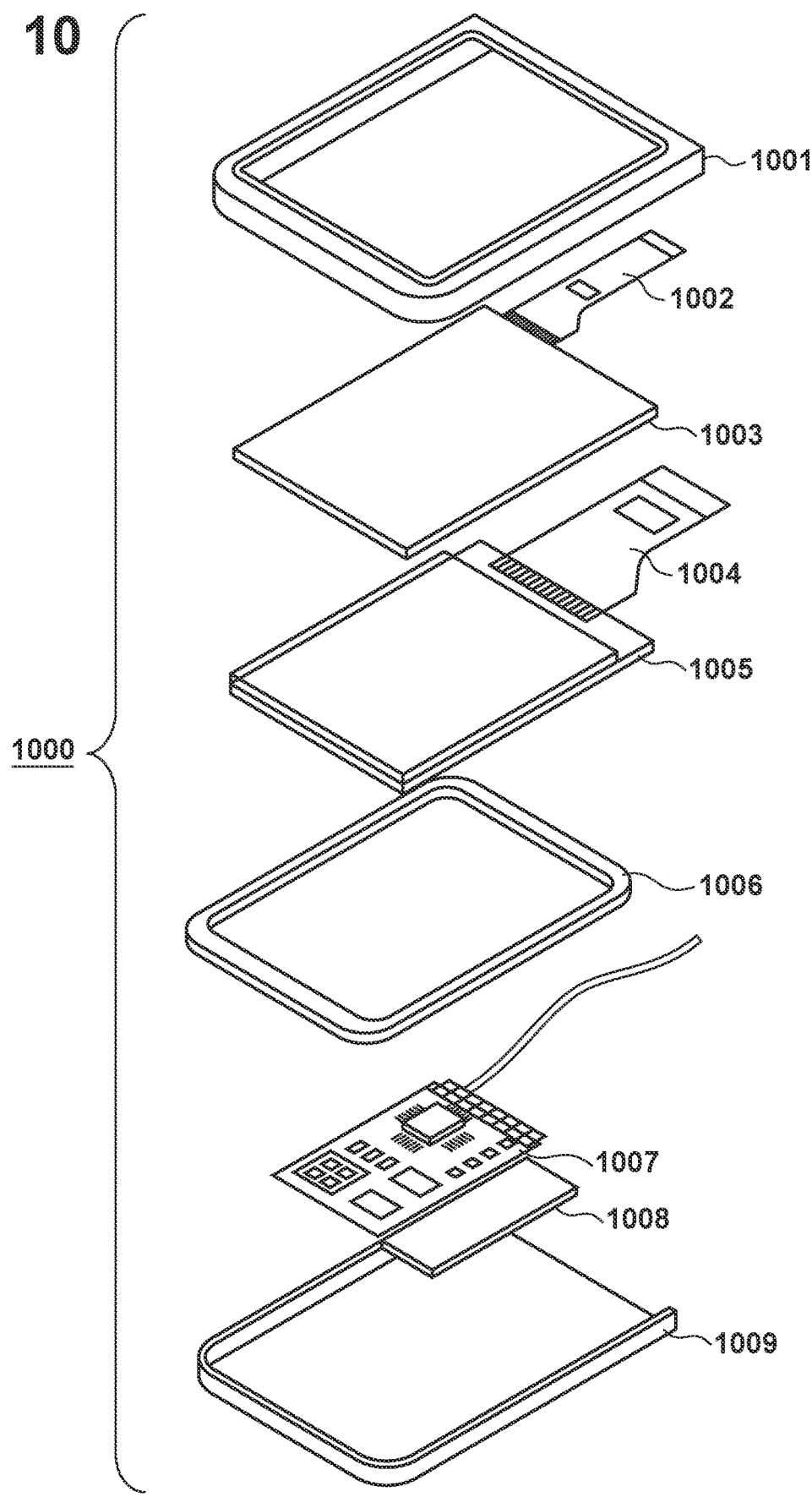
FIG. 10 is a view showing an application example of the display apparatus of the embodiment.

FIG. 10 is a schematic view showing an application example of a display apparatus using the display apparatus DS of this embodiment. A display apparatus 1000 may include a touch panel 1003, a display panel 1005, a frame 1006, a circuit board 1007, and a battery 1008 between an upper cover 1001 and a lower cover 1009. Flexible printed circuits (FPCs) 1002 and 1004 are respectively connected to the touch panel 1003 and the display panel 1005. Active elements such as transistors are arranged on the circuit board 1007. The battery 1008 may not be provided if the display device 1000 is not a portable equipment, or need not be provided in this position even if the display apparatus 1000 is a portable equipment. The display 100 of the display apparatus DS described above can be applied to the display panel 1005. The display 100 of the display apparatus DS functioning as the display panel 1005 is connected to the active element such as the transistor arranged on the circuit board 1007 to be operated. The circuit board 1007 can correspond to the respective components other than the data generator 201 and the display 100 of the video display 200 described above.

The display apparatus 1000 shown in FIG. 10 may be used for an image display of a photoelectric conversion apparatus (image capturing apparatus) including an optical unit which includes a plurality of lenses, and an image sensor that receives light having passed through the optical unit and photoelectrically converts it into an electrical signal. The photoelectric conversion apparatus may include an image display that displays information acquired by the image sensor. The image display may be either a display exposed outside the photoelectric conversion apparatus, or a display arranged in the finder. The photoelectric conversion apparatus may be a digital camera or a digital video camera.

Figure 11:
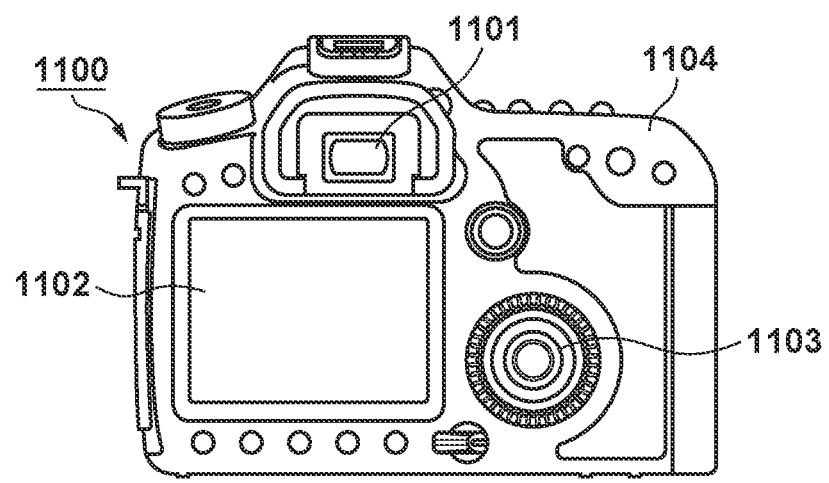
FIG. 11 is a view showing an example of a photoelectric conversion apparatus using the display apparatus of the embodiment.

FIG. 11 is a schematic view showing an example of the photoelectric conversion apparatus using the display apparatus DS of this embodiment. A photoelectric conversion apparatus 1100 may include a viewfinder 1101, a rear display 1102, an operation unit 1103, and a housing 1104. The photoelectric conversion apparatus 1100 can also be referred to as an image capturing apparatus. The display 100 of the display apparatus DS described above can be applied to the view finder 1101 serving as an image display. In this case, the display apparatus DS can display not only an image to be captured but also environment information, image capturing instructions, and the like. Examples of the environment information are the intensity and direction of external light, the moving velocity of an object, and the possibility that an object is covered with an obstacle.

In many cases, the timing suitable for image capturing is a very short time, so the information is displayed as soon as possible. Therefore, the display apparatus DS including an organic light emitting material such as an OLED as the pixel 101 can be used for the view finder 1101. This is because the organic light emitting material has a high response speed. The display apparatus DS using the organic light emitting material is more suitable than a liquid crystal display apparatus in the apparatuses that require a high display speed.

The photoelectric conversion apparatus 1100 includes an optical unit (not shown). The optical unit includes a plurality of lenses, and forms an image of light having passed through the optical unit on a photoelectric conversion element (not shown) housed in the housing 1104. It is possible to adjust the focus by adjusting the relative positions of the plurality of lenses. This operation can be performed automatically.

The display apparatus DS may be applied to the image display of an electronic equipment. In this case, both a display function and an operation function may be provided. Examples of the mobile terminal include a mobile phone such as a smartphone, a tablet, and a head mounted display.

Figure 12:
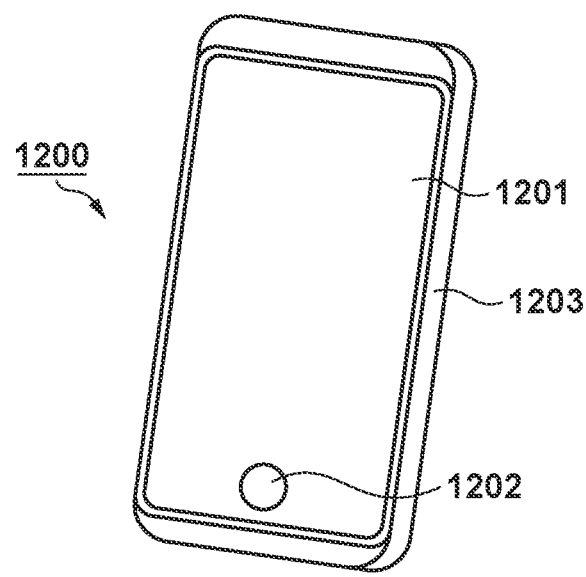
FIG. 12 is a view showing an example of an electronic equipment using the display apparatus of the embodiment.

FIG. 12 is a schematic view showing an example of the electronic equipment using the display apparatus DS of this embodiment. An electronic equipment 1200 includes an image display 1201, an operation unit 1202, and a housing 1203. The housing 1203 may include a circuit, a printed board including the circuit, a battery, and a communication unit. The operation unit 1202 may be a button or a touch panel type sensing unit. The operation unit 1202 may be a biometrics unit that recognizes a fingerprint and releases a lock or the like. A portable equipment including a communication unit can also be called a communication equipment. The display apparatus DS described above can be applied to the image display 1201.

Figure 13A:
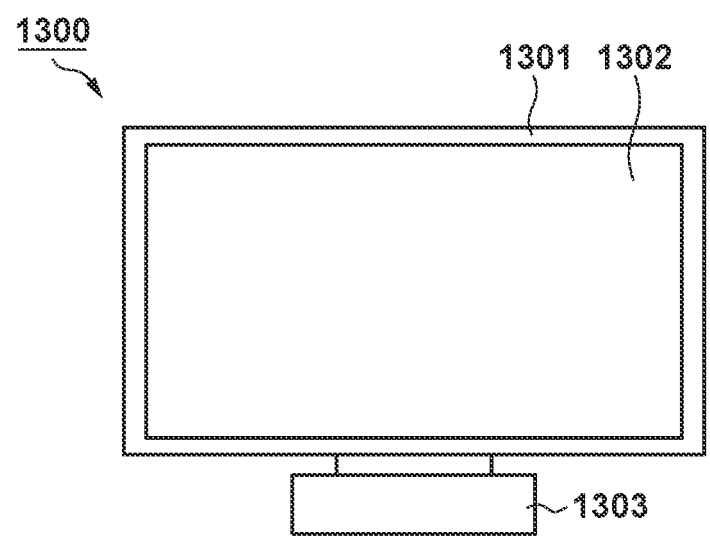
FIGS. 13A and 13B are views each showing an application example of the display apparatus of the embodiment.
Figure 13B:
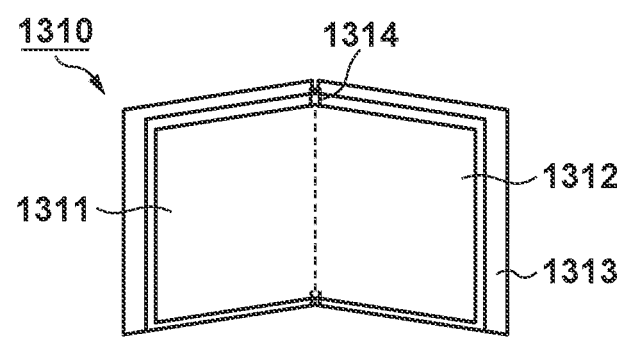

FIGS. 13A and 13B are schematic views each showing an application example of the display apparatus DS of this embodiment. FIG. 13A shows an application example of the display apparatus DS to a television monitor or a PC monitor. A display apparatus 1300 includes a frame 1301 and an image display 1302. The display 100 of the display apparatus DS described above can be applied to the image display 1302. The display apparatus 1300 may include a base 1303 that supports the frame 1301 and the image display 1302. The base 1303 is not limited to the form shown in FIG. 11A. For example, the lower side of the frame 1301 may serve as the base 1303. The frame 1301 and the image display 1302 may be bent. The curvature radius may be between 5,000 mm (inclusive) and 6,000 mm (inclusive).

FIG. 13B is a schematic view showing another application example using the display apparatus DS of this embodiment. A display apparatus 1310 shown in FIG. 13B is configured to be bendable, and is a so-called foldable display apparatus. The display apparatus 1310 includes a first image display 1311, a second image display 1312, a housing 1313, and a bending point 1314. The display 100 of the display apparatus DS described above can be applied to each of the first image display 1311 and the second image display 1312. The first image display 1311 and the second image display 1312 may be one seamless display apparatus. The first image display 1311 and the second image display 1312 can be divided at the bending point. The first image display 1311 and the second image display 1312 may display different images, or one image may be displayed with the first image display 1311 and the second image display 1312.

Figure 14A:
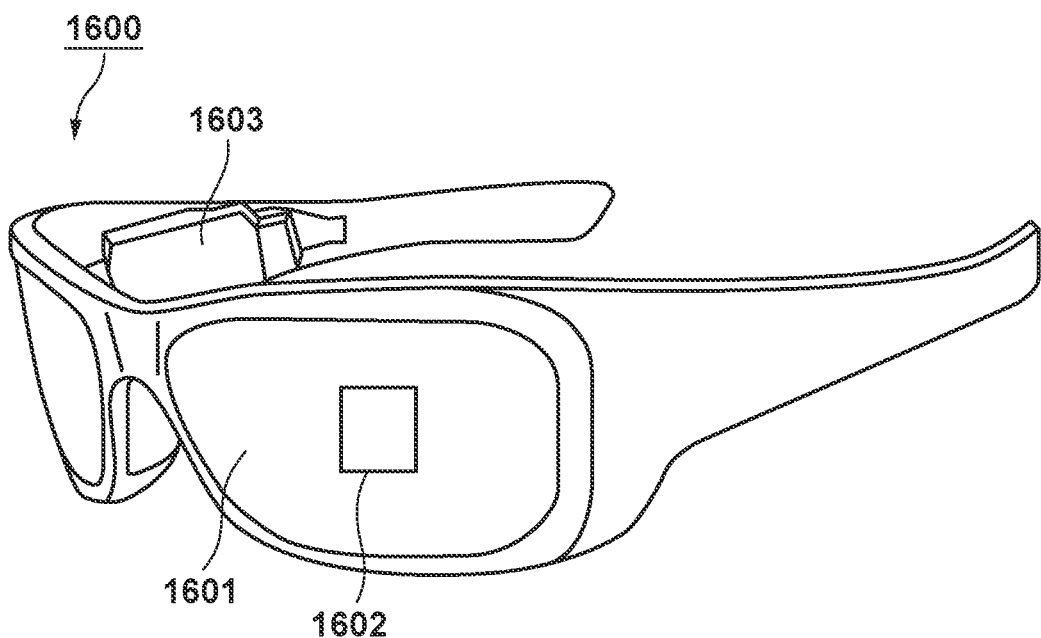
FIGS. 14A and 14B are views each showing an example of a wearable device using the display apparatus of the embodiment.
Figure 14B:
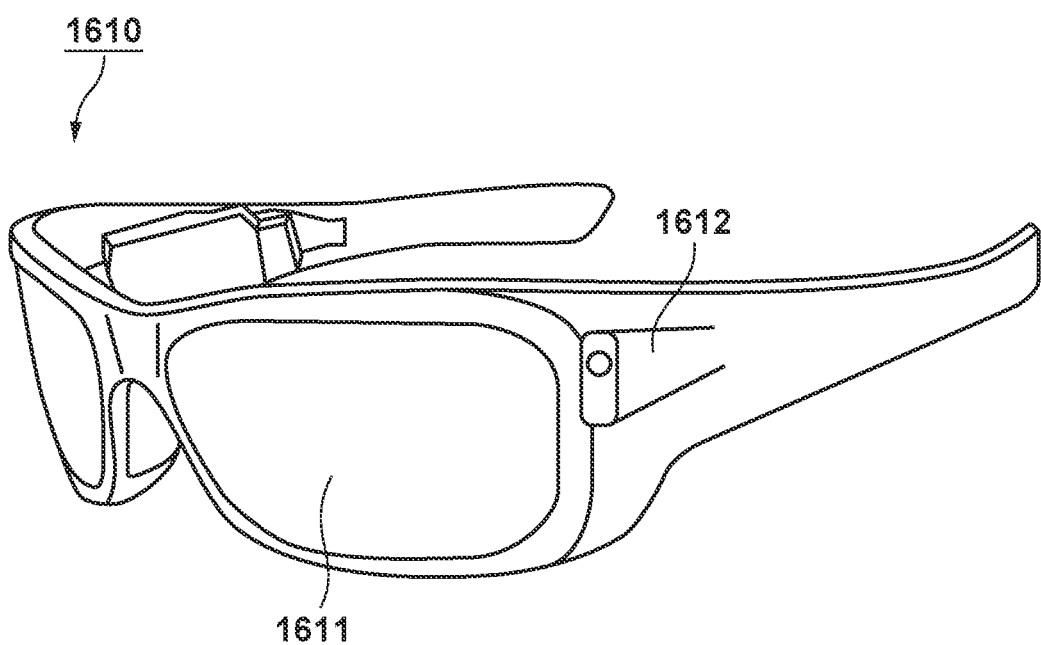

Still another application example of the display apparatus DS of each embodiment described above will be described with reference to each of FIGS. 14A and 14B. The display apparatus DS can be applied to a system that can be worn as a wearable device such as smartglasses, a head mounted display (HMD), or a smart contact lens. A wearable device used for such application examples includes an image capturing apparatus capable of photoelectrically converting visible light and a light emitting device capable of emitting visible light.

Glasses 1600 (smartglasses) according to one application example will be described with reference to FIG. 14A. An image capturing apparatus 1602 such as a CMOS sensor or an SPAD is provided on the front surface side of a lens 1601 of the glasses 1600. In addition, the display apparatus DS described above is provided as a display device on the back surface side of the lens 1601.

The glasses 1600 further include a control apparatus 1603. The control apparatus 1603 functions as a power supply that supplies power to the image capturing apparatus 1602 and the display apparatus DS according to each embodiment. In addition, the control apparatus 1603 controls the operations of the image capturing apparatus 1602 and the display apparatus DS. An optical system configured to condense light to the image capturing apparatus 1602 is formed on the lens 1601.

Glasses 1610 (smartglasses) according to one application example will be described with reference to FIG. 14B. The glasses 1610 includes a control apparatus 1612, and an image capturing apparatus corresponding to the image capturing apparatus 1602 and the display apparatus DS serving as a display device are mounted on the control apparatus 1612. The image capturing apparatus in the control apparatus 1612 and an optical system configured to project light emitted from the display apparatus DS are formed in a lens 1611, and an image is projected to the lens 1611. The control apparatus 1612 functions as a power supply that supplies power to the image capturing apparatus and the display apparatus DS, and controls the operations of the image capturing apparatus and the display apparatus DS. The control apparatus 1612 may include a line-of-sight detection unit 202 that detects the line of sight of a wearer. The detection of a line of sight may be done using infrared rays. An infrared ray emitting unit emits infrared rays to an eyeball of the user who is gazing at a displayed image. An image capturing unit including a light receiving element detects reflected light of the emitted infrared rays from the eyeball, thereby obtaining a captured image of the eyeball. A reduction unit for reducing light from the infrared ray emitting unit to the display unit in a planar view is provided, thereby reducing deterioration of image quality.

The line of sight of the user to the displayed image is detected from the captured image of the eyeball obtained by capturing the infrared rays. An arbitrary known method can be applied to the line-of-sight detection using the captured image of the eyeball. As an example, a line-of-sight detection method based on a Purkinje image obtained by reflection of irradiation light by a cornea can be used.

More specifically, line-of-sight detection processing based on pupil center corneal reflection is performed. Using pupil center corneal reflection, a line-of-sight vector representing the direction (rotation angle) of the eyeball is calculated based on the image of the pupil and the Purkinje image included in the captured image of the eyeball, thereby detecting the line of sight of the user.

The display apparatus DS according to the embodiment of the disclosure can include an image capturing apparatus including a light receiving element, and a displayed image may be controlled based on the line-of-sight information of the user from the image capturing apparatus.

More specifically, the display apparatus DS decides a first visual field region at which the user is gazing and a second visual field region other than the first visual field region based on the line-of-sight information. The first visual field region and the second visual field region may be decided by the control apparatus of the display apparatus DS, or those decided by an external control apparatus may be received. In the display region of the display apparatus DS, the display resolution of the first visual field region may be controlled to be higher than the display resolution of the second visual field region. That is, the resolution of the second visual field region may be lower than that of the first visual field region.

In addition, the display region includes a first display region and a second display region different from the first display region, and a region of higher priority is decided from the first display region and the second display region based on line-of-sight information. The first display region and the second display region may be decided by the control apparatus of the display apparatus DS, or those decided by an external control apparatus may be received. The resolution of the region of higher priority may be controlled to be higher than the resolution of the region other than the region of higher priority. That is, the resolution of the region of relatively low priority may be low.

Note that AI may be used to decide the first visual field region or the region of higher priority. The AI may be a model configured to estimate the angle of the line of sight and the distance to a target beyond the line of sight from the image of the eyeball using the image of the eyeball and the direction of actual viewing of the eyeball in the image as supervised data. The AI program may be held by the display apparatus DS, the image capturing apparatus, or an external apparatus. If the external apparatus holds the AI program, it is transmitted to the display apparatus DS via communication.

When performing display control based on line-of-sight detection, the display apparatus DS can be applied to smartglasses further including an image capturing apparatus configured to capture the outside. The smartglasses can display captured outside information in real time.

OTHER EMBODIMENTS

Figure 15:
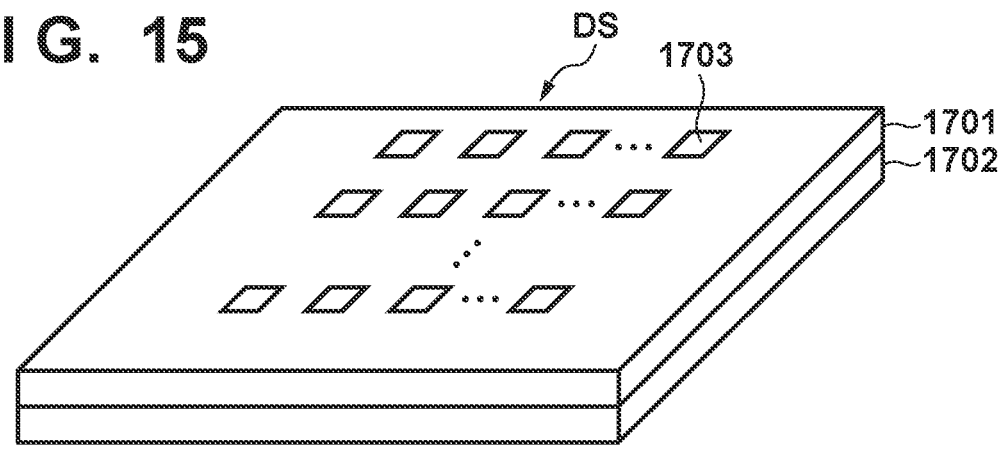
FIG. 15 is a view showing an arrangement example of a display apparatus of another embodiment.

FIG. 15 is a view showing an arrangement example in which the video display 200 of the display apparatus DS shown in FIG. 2 is divided into a first board 1701 and a second board 1702 and stacked. In FIG. 15, the first board 1701 and the second board 1702 are electrically connected to each other. The board of the display apparatus DS facing to the direction of a user is the first board 1701, and a light emitting surface 1703 of the display 100 is arranged on the first board 1701.

Figure 16:
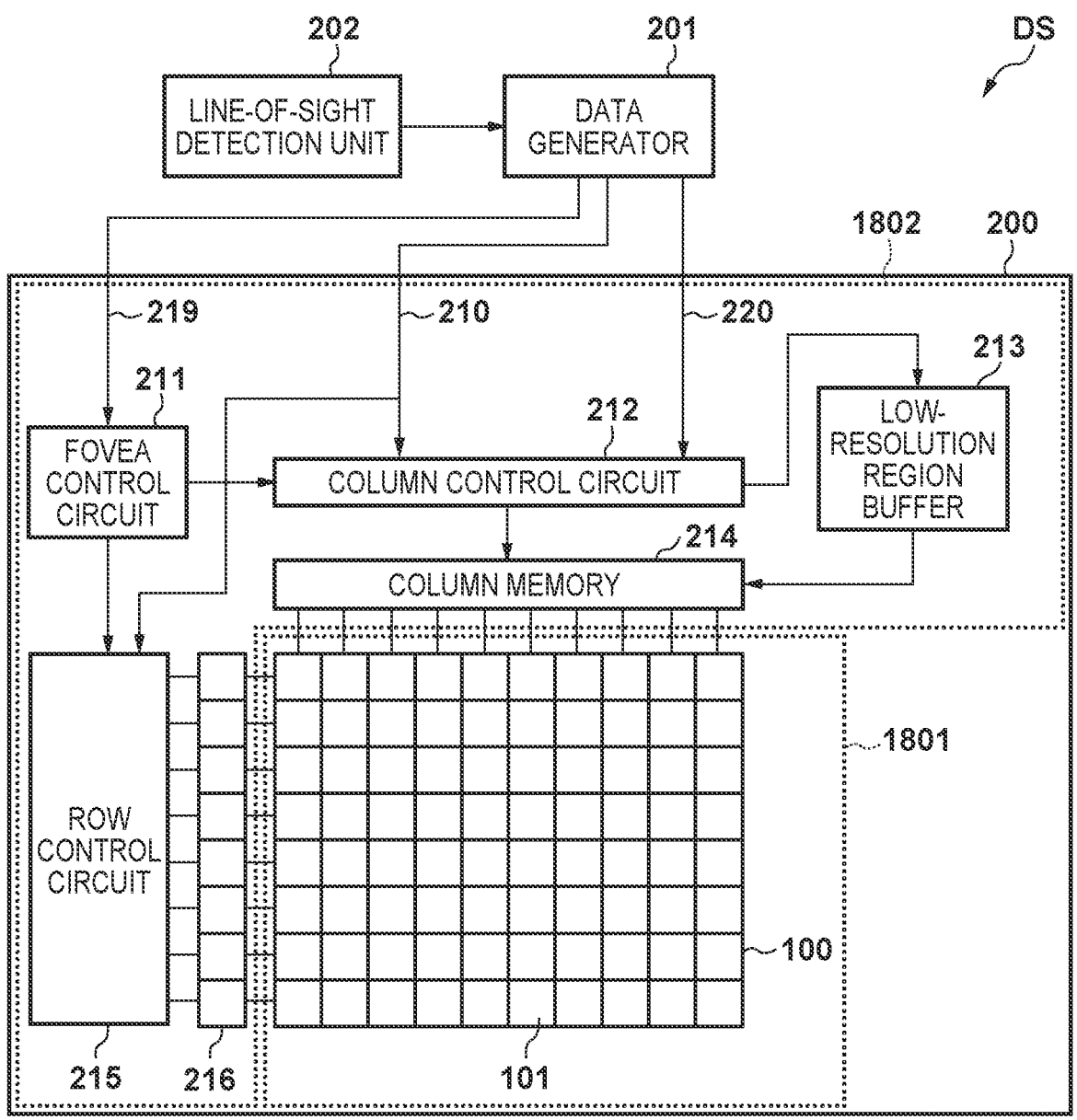
FIG. 16 is a block diagram showing the arrangement example of the display apparatus of the other embodiment.

FIG. 16 shows an arrangement in which the respective components of the display apparatus DS shown in FIG. 2 are divided into a pixel circuit 1801 arranged on the first board 1701 and a processing circuit 1802 arranged on the second board. The pixel circuit 1801 is formed by the display 100. The processing circuit 1802 is formed by the fovea control circuit 211, the column control circuit 212, the low-resolution region buffer 213, the column memory 214, and the row control circuit 215. The display 100 is electrically connected to the row control circuit 215 and the column memory 214. An image is displayed by selecting the row of the display 100 using the row control circuit 215 and transferring display data from the column memory 214 to the display 100.

As described above, the display apparatus DS includes the video display 200 that includes the display 100 and control circuits such as column control circuits 212 and row control circuits 215 for operating the display unit 100. According to this embodiment, since the components of the video display 200 other than the display 100 are arranged on the second board 1702, the area of the video display 200 in a planar view can be decreased or the size of each element can be increased as compared to the arrangement shown in FIG. 2. This stacked arrangement can also be applied to the arrangement shown in each of FIGS. 5 and 7, and a similar effect can be obtained.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2021-126043, filed Jul. 30, 2021, and Japanese Patent Application No. 2022-080354, filed May 16, 2022, which are hereby incorporated by reference herein in their entirety.

What is claimed is:

1. An apparatus comprising:
a display in which a plurality of pixels are arranged in an array; and
a generator configured to, in a first frame, generate first data corresponding to a first region of the display to display a first image in the first region of the display and, in a second frame preceding or succeeding the first frame in a display order, generate second data corresponding to a second region of the display, which includes the first region and is larger than the first region, to display a second image in the second region of the display,
wherein a region of the second region is defined as a third region, a resolution of the first image and a resolution of at least the third region in the second image are different from each other, and
an image displayed using the second data has uniform resolution.

2. The apparatus according to claim 1, wherein
the resolution of the first image is higher than the resolution of at least the third region in the second image.

3. The apparatus according to claim 1, further comprising a second buffer configured to hold the second data,
wherein in the first frame, the display displays, in the third region, an image corresponding to the second image using the second data received in the second frame preceding the first frame in a display order.

4. The apparatus according to claim 1, further comprising a first buffer configured to hold the first data,
wherein in the second frame, the display displays, in the first region, an image corresponding to the first image using the first data received in the first frame preceding the second frame.

5. The apparatus according to claim 1, wherein the resolution of the first image is higher than the resolution of the second image.

6. The apparatus according to claim 1, wherein the resolution of the first image is $2^n$ times a resolution of at least the third region in the second image, n being a positive integer here.

7. The apparatus according to claim 1, wherein a ratio of the resolution of at least the third region in the second image to the resolution of the first image is equal to a ratio of the number of pixels in the first region out of the plurality of pixels to the number of pixels in the second region out of the plurality of pixels.

8. The apparatus according to claim 1, further comprising a detector configured to detect a line-of-sight position of a user with respect to the display,
wherein a position of the first region in the display is decided based on the line-of-sight position.

9. The apparatus according to claim 1, wherein the third region surrounds the first region.

10. The apparatus according to claim 1, wherein the first frame and the second frame are repeated in a predetermined order.

11. The apparatus according to claim 1, wherein the first frame and the second frame are repeated alternately.

12. The apparatus according to claim 1, wherein the generator is configured to generate, from one image data, the first data and the second data used in continuous frames including the first frame and the second frame.

13. The apparatus according to claim 1, wherein the generator is configured to generate, from image data different from each other, the first data and the second data used in continuous frames including the first frame and the second frame.

14. The apparatus according to claim 1, comprising a video display that comprises the display and a control device configured to operate the display unit,
wherein the video display is formed by a plurality of boards connected to each other.

15. A conversion apparatus comprising:
an optical unit including a plurality of lenses;
a sensor configured to receive light having passed through the optical unit; and
an image display configured to display an image,
wherein the image display is a display configured to display an image captured by the sensor, and comprises the apparatus according to claim 1.

16. An equipment comprising:
a housing provided with an image display; and
a communication unit provided in the housing and configured to perform external communication,
wherein the image display comprises the apparatus according to claim 1.

17. A wearable device comprising
a display device configured to display an image,
wherein the display device comprises the apparatus according to claim 1.

* * * * *